March 31, 1953     J. H. BECKLEY     2,633,410
METHOD AND MEANS OF DETECTING ALBUMIN AND
GLOBULIN IN URINE AND OTHER BODY LIQUIDS
Filed April 13, 1949
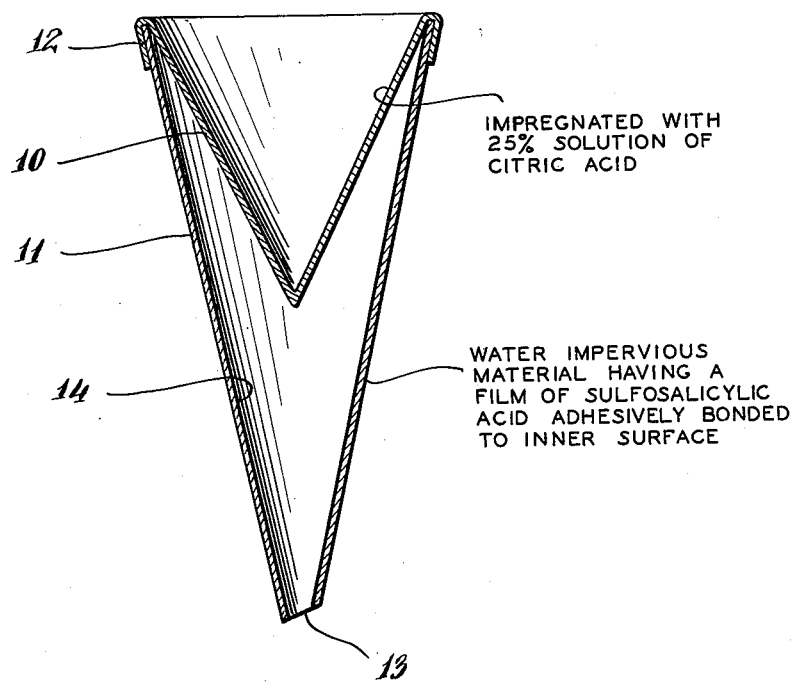
INVENTOR.
John Henry Beckley
BY
Fraser, Myers & Manley.
ATTORNEYS.

Patented Mar. 31, 1953

2,633,410

UNITED STATES PATENT OFFICE 2,633,410

METHOD AND MEANS OF DETECTING ALBUMIN AND GLOBULIN IN URINE AND OTHER BODY LIQUIDS

John Henry Beckley, New York, N. Y., assignor to The Denver Chemical Manufacturing Company, New York, N. Y., a corporation of Colorado Application April 13, 1949, Serial No. 87,256

7 Claims. (Cl. 23—230)

The present invention relates to a method and means of detecting albumin and globulin in urine and other body liquids, and aims to provide certain improvements in both the methods and means heretofore used.

The detection of small amounts of serum albumin and serum globulin in urine is of utmost importance as their presence almost always indicates a pathological condition. There are several different methods employed for detecting said substances in urine. Some of these methods require the application of heat to the specimen being treated, others require the use of special reagents, while still others may be termed dry tests, wherein the only liquid employed is the specimen of urine being tested.

Most of the wet tests require at least three steps, namely: (1) the addition of an acid to the specimen to hold the phosphates in solution and to precipitate mucin and mucoids present; (2) filtering to remove debris such as pus cells; and (3) the addition of an acid to coagulate or precipitate the albumin. Of course these tests require time, and where numerous tests must be made daily, for example, in a hospital laboratory, or where a test must be made rapidly, for example, in a physician's office where a patient under examination awaits the result of the test, time is of the essence in making the test. The so-called dry tests heretofore proposed and which are designed to be performed in considerably less time than the wet test, have been found to be not wholly reliable.

According to the standard procedure, a urine to be tested for albumin must be acid to litmus paper. If it is not acid it must be so rendered by the addition thereto of acetic acid or some other acid. If the urine is neutral or alkaline, inaccurate findings may occur. The purpose of acidification is to put the amorphous phosphates which may be present in urine into solution, since the amorphous phosphates are precipitated in neutral or alkaline urine and thus form a white cloud or sediment which may give rise to the inaccurate findings. After the sample or specimen has been acidified the urine should be examined to see if it is clear, and if not, it must be so rendered by filtration or centrifugation. Also, according to various authorities, one of the main sources of error in the detection of albumin in urine is the presence of mucin and mucoid bodies which are precipitated by acetic acid and hence may be removed by filtration after acidification of the specimen. After acidification and clarification the urine sample is ready for testing. The various methods heretofore employed involve the use of test tubes, pipettes, conical test glasses, funnels, filter paper, black spot test plates, various liquid reagents, and frequently a direct heat source of some kind.

The simplest and most reliable reagent for testing for albumin in a clear acidified urine sample is sulfosalicylic acid which, when added to a urine containing albumin or globulin, forms a turbidity or cloudiness in the specimen.

An object of the present invention is to provide a method and means for detecting albumin and globulin in urine and other body fluids which eliminate the difficulties and shortcomings in the known methods of testing. A further object is to provide a method and means for detecting albumin in urine and other body fluids, according to which:

(a) No liquid reagents are used.

(b) False positives are eliminated.

(c) The test is performed without the application of heat.

(d) The test can be completed in less than one minute.

The foregoing and other objects of my invention I accomplish by the acidification and clarification of the urine specimen and the detection of serum albumin and serum globulin by an albumin detecting medium such as sulfosalicylic acid in one operation by the use of a specially prepared reagent-treated filter and detecting device which is adapted to be placed in a conventional funnel, mouth of a test tube or mouth of any other transparent receptacle, and through which filter and detecting device the specimen to be tested is allowed to pass. The liquid passing through the device, if clear, is free of albumin, and if cloudy or turbid indicates the presence of serum albumin or serum globulin. The invention will be better understood from the detailed description which follows when considered in connection with the accompanying drawing which shows a diametrical section through a reagent-treated filter and detecting device constituting an essential part of the invention.

The reagent-treated filter and detecting device may assume various forms, and in the embodiment shown in the accompanying drawing consists essentially of two nested liquid-receiving receptacles 10 and 11 which are preferably held in assembled relation adjacent their lip or edge, as shown at 12, by having portions of the inner receptacle folded over the lip of the outer receptacle and, if desired, secured thereto. The receptacle 10 is preferably made of a fine grade of filter paper, by either folding a blank, or by cutting a blank and pasting the edges thereof in any well known manner, the said filter paper being impregnated with a solution of an organic acid or anhydride and allowed to dry. Preferably the filter paper receptacle 10 is impregnated with a 25% solution of citric acid and allowed to dry, the impregnation being accomplished either before or after the receptacle is shaped. The receptacle 11 is substantially longer than the receptacle 10 and preferably has its inner face spaced from the lower portion of the outer face of the receptacle 10. The receptacle 11 may be formed of any suitable water impervious material such as "glassine" paper, which is neutral in reaction, and is left open at its tip, as shown at 13. The inner surface of said receptacle 11 has adherent thereon a dry film 14 of an albumin precipitating reagent, preferably a layer of sulfosalicylic acid crystals or powder, which may be held onto the water impervious material in any preferred manner, for example, by a bonding agent which is soluble in urine. Among the bonding agents which I have found suitable are collodion, flexible collodion, various lacquers, ethylene glycol mono-ethyl ether, ethylene glycol and diethylene glycol. I have found that ethylene glycol mono-ethyl ether serves admirably well as a carrier and bonding agent for the sulfosalicylic acid. To affix the sulfosalicylic acid to the inner surface of the receptacle 11 the crystalline acid is first dissolved in ethylene glycol mono-ethyl ether, then painted or sprayed onto one surface of the water impervious material and allowed to dry. The residue which adheres to the receptacle wall is composed essentially of crystals or particles of sulfosalicylic acid and ethylene glycol, both of which are soluble in urine.

In performing the test upon a urine specimen to determine whether or not it contains albumin, the reagent-treated filter and detecting device is placed with its tip end extending within the mouth of a test tube or other transparent receptacle and about 5 cc. of urine to be tested is poured into the inner receptacle 10 and allowed to pass therethrough and over the inner surface of the receptacle 11 and into the receiving test tube or other transparent receptacle. The urine in passing through the receptacle 10 is acidified by the citric acid with which the receptacle is impregnated and clarified as it passes through the filter paper. The filtrate upon passing through receptacle 10 comes into contact with the sulfosalicylic acid on the inner surface of the receptacle 11 and then runs off through the open tip 13 into the receiving receptacle. If the run-off filtrate collected in the receiving receptacle is cloudy or turbid, serum albumin is present in the urine; if clear, no albumin is present. The degree of turbidity or cloudiness gives an approximation of the amount of albumin present. The complete test can be carried out in less than a minute and it will thus be appreciated that the means and methods which I have provided for detecting the presence of albumin in urine can be simply and expeditiously carried out either by a layman or in a laboratory.

While I have shown and described a preferred embodiment of my invention it is to be understood that the specific character and construction of the specially prepared reagent-treated testing device, as well as the chemical reagents used therewith, may be varied within the range of mechanical and chemical skill without departing from the spirit of the invention as defined in the appended claims.

What I claim is:

1. The method of testing for the presence of albumin in urine and other body liquids which consists in passing a quantity of a specimen to be tested in a single step successively through an acidifying medium selected from the group consisting of organic acids and their anhydrides, a filtering medium and over an albumin precipitating medium, collecting the filtrate after it has passed over the albumin precipitating medium, and examining said filtrate for turbidity.

2. An article of manufacture for facilitating chemical testing, comprising a plurality of superposed dry nested liquid receiving receptacles, the receptacle adapted to first receive the liquid to be tested being a filtering medium impregnated with a dry reagent and a second receptacle adapted to receive the filtrate from the first receptacle containing adherent to the wall of the receptacle a different dry reagent, said second receptacle being capable of passing said filtrate therethrough after contacting said second reagent.

3. An article of manufacture for facilitating chemical testing, comprising a plurality of superposed dry nested liquid receiving receptacles, the receptacle adapted to first receive the liquid to be tested being a filtering medium impregnated with a dry acidifying reagent selected from the group of organic acids and their anhydrides and the receptacle adapted to receive the filtrate from the first receptacle containing a different dry reagent adherent to the wall of the second receptacle, said second receptacle being capable of passing said filtrate therethrough after contacting said second reagent.

4. An article of manufacture for facilitating chemical testing, comprising a plurality of superposed dry nested liquid receiving receptacles, the receptacle adapted to first receive the material to be tested being a filtering medium having adherent thereon a dry chemical reagent and the receptacle adapted to receive the filtrate from the first receptacle having an inner wall portion spaced from an outer wall portion of the first receptacle and having adherent thereon a dry chemical reagent different from the reagent on the first receptacle.

5. An article of manufacture for facilitating chemical testing, comprising a plurality of superposed dry nested liquid receiving receptacles held in assembled relation adjacent at least one of their rim portions, the receptacle adapted to first receive the material to be tested being a filtering medium having adherent thereon a dry chemical reagent and the receptacle adapted to receive the filtrate from the first receptacle having an inner wall portion spaced from an outer wall portion of the first receptacle and having adherent thereon a dry chemical reagent different from the reagent on the first receptacle.

6. A device for facilitating the testing for the presence of albumin in urine and other body liquids, comprising a plurality of superposed dry nested liquid receiving receptacles, the receptacle adapted to first receive the material to be tested being a filtering medium impregnated with a dry acidifying reagent selected from the group consisting of organic acids and their anhydrides and the receptacle adapted to receive the filtrate from the first receptacle having an inner wall portion spaced from an outer wall portion of the first receptacle and having on the inner surface thereof an adherent film of a dry albumin-precipitating agent.

7. A device for facilitating the testing for the presence of albumin in urine and other body liquids, comprising a plurality of superposed dry nested liquid receiving receptacles, the receptacle adapted to first receive the material to be tested being a filtering medium impregnated with citric acid and the receptacle adapted to receive the filtrate from the first receptacle having an inner wall portion spaced from an outer wall portion of the first receptacle, and having on the inner surface thereof an adherent film of dry sulfosalicylic acid.

JOHN HENRY BECKLEY.

REFERENCES CITED

The following references are of record in the file of this patent:

UNITED STATES PATENTS

| Number | Name | Date |
| --- | --- | --- |
| 925,582 | Kipp | June 22, 1909 |
| 2,314,336 | Goodale | Mar. 23, 1943 |
| 2,314,548 | McClintock | Mar. 23, 1943 |

OTHER REFERENCES

Catalogue #90, Fisher Scientific Co., St. Louis, Mo., copyright 1942, page 448.